Patented Feb. 10, 1953

2,628,172

UNITED STATES PATENT OFFICE 2,628,172

PROCESS FOR PREPARING A POLYETHYLENE DISPERSION AND METHOD OF APPLYING SAME TO A POLYETHYLENE SURFACE

Henry Jenett, deceased, late of Montclair, N. J., by Caroline Louise Maria Jenett, executrix, Montclair, N. J., assignor to Emhart Manufacturing Company, Hartford, Conn., a corporation of Delaware No Drawing. Application October 20, 1950, Serial No. 191,315

6 Claims. (Cl. 117—103)

This invention relates to a coating and ink vehicle composition and to inks adapted for printing on polyethylene. It also relates to methods of preparing such compositions and inks, to methods of printing designs or characters of said ink on polyethylene film or other surfaces, and to the resulting printed products. This final printed design on polyethylene film is made in one printing step and is not removed or stripped from the film by the usual test of attaching a strip of adhesive tape thereto and then removing the tape.

So far as is known, every printed design upon polyethylene film prepared in one step by any previously known method or with any previously known printing composition does not withstand this test.

Ethylene polymers have achieved substantial commercial success in view of their unique combination of desirable properties, as known in the art. However, despite the very urgent demand in the art, and despite the wide variety of published proposals or speculations, it has not been possible heretofore to print, decorate, or deposit upon a polyethylene film designs which will withstand the adhesive stripping test.

Proposals have been made heretofore for depositing a continuous film of polyethylene upon paper or other surfaces. In one such proposal, the polyethylene material is applied in molten condition. In another such proposal, the polyethylene material is applied hot in the form of a solution. So far as is known, these methods are not practical for printing discontinuous designs of polyethylene on any surface, are not practical for depositing a polyethylene coating on a polyethylene film, and are not suitable for printing or decorating under usual printing press operating conditions at room temperatures.

An object of this invention is to provide means by which printing may be accomplished effectively on polyethylene and similar surfaces. To this end, a further object resides in providing an improved composition capable of being applied to polyethylene and similar surfaces as a design, print, or decoration, or a protective coating, and of being retained on such surfaces against forces such as are exerted by the adhesive tape stripping test; these results being attained without the need of pretreating the surface by blasting, etching, etc.

Further objects of the invention reside in the provision of methods, not only of compounding compositions of the foregoing character, but also of depositing such compositions upon surfaces comprising polyethylene or its modifications; this being done without application of excessive heat which will destroy or distort the base, but only by applying sufficient heat to remove the carrier liquid medium and fuse the deposit on the base.

Yet another object of the invention lies in the provision of a printed product comprising polyethylene or like material having deposited thereon a composition having desired properties as hereinafter described and having an affinity for the surface of such polyethylene sufficient to withstand the aforesaid adhesive tape stripping test.

It has been found in accordance with the invention that stable dispersions of finely divided polyethylene in specific organic liquid media may be prepared which are flowable at room temperature and are eminently suitable as coating compositions and vehicles for printing and decorating upon polyethylene film or other surfaces at room temperature, e. g., by means commonly employed in the printing arts, such as gravure printing. The coating or printed design is subjected to an elevated temperature below the softening point of the base but high enough to evaporate the liquid medium, fuse and level the polyethylene material deposited on the base to form a homogeneous film, and to cause the deposit to bond with the polyethylene base, or other base or substrate material.

Dispersions in accordance with the invention may be applied to surfaces of polyethylene, cellulose acetate or polyvinyl resin, such as polyvinyl chloride, polyvinyl acetate, copolymers of vinyl chloride and vinyl acetate, polyvinyl butyral, and polyvinylidene chloride, at room temperature by known printing or decorating means, and then heat treated to give a coated or printed article. Surprisingly, while a polyvinyl resin ink will not adhere to a polyethylene base strongly enough to withstand the stripping test, a polyethylene ink in accordance with the invention will so adhere to a polyvinyl resin base.

The polyethylene dispersions in accordance with the invention preferably are prepared by dissolving or dispersing polyethylene in a mixture of a solvent for polyethylene and of a non-solvent for polyethylene. This may be accomplished in conventional mixing equipment, such as a ball-mill, or by dissolving the polyethylene in the solvent mixture, with application of heat and with agitation for approximately twenty minutes or longer until after the solution or dispersion has become clear, desirably at a temperature above the solution temperature of polyethylene in the solvent employed, and then cooling the resulting solution slowly with agitation, ordinarily at a cooling rate not exceeding about 3° C. per minute and preferably in the range of about 0.5° to about 2° C. per minute, to room temperature, i. e., the temperature at which the dispersion is to be applied to the base.

Dispersions may be made using any of the commercially available polyethylene materials, or mixtures thereof, and these usually range in average molecular weight from 7,000 to about 20,000 (Staudinger method). The organic liquid medium is made up of, i. e., consists essentially of, a solvent and a nonsolvent for the polyethylene. Other materials such as are usually added in coating or printing compositions may be included provided they do not render the composition unsuitable for the purposes of the invention as described herein.

The polyethylene solvent should have a boiling point in the range of about 80° to about 300° C. and may be typified by an aromatic hydrocarbon such as benzene, toluene, xylene, tetrahydronaphthalene, dimethylnaphthalene, or a chloro or bromo derivative thereof such as dichlorobenzene, or other known solvent. The term "polyethylene solvent," as used in the specification and claims, means an organic liquid which will dissolve solid polyethylene at elevated temperatures to form a clear solution.

The nonsolvent should have a boiling point in the range of at least 25°, preferably 75° C. or above, say to 300° C., and may be typified by an aliphatic paraffin hydrocarbon such as pentane, hexane, heptane, octane, decane, or Hi Flash Mineral Spirits (petroleum naphtha, boiling range 330–400° F.) and the like, or an oxygenated organic compound such as a ketone such as acetone, methyl ethyl ketone, methyl isobutyl ketone, mesityl oxide, isophorone, cyclohexanone, methyl cyclohexanone, and the like, or an ether such as dibutyl ether or dihexyl ether, or an aldehyde such as valeraldehyde, hexaldehyde, heptaldehyde, octaldehyde, decaldehyde, or an alcohol such as a butyl alcohol, amyl alcohol, and the like. The term "polyethylene nonsolvent," as used in the specification and claims, means an organic liquid which will not dissolve solid polyethylene at elevated temperatures below the melting point of polyethylene to form a clear solution.

For preferred results in coating or printing on a polyethylene base the polyethylene polymer in the dispersion should have a lower fusing temperature than that of the base, i. e., the former polymer should be of a lower molecular weight.

The polyethylene content of the dispersion may vary within a wide range, depending upon the molecular weight of the polyethylene and the proportions of solvent and nonsolvent. The amounts of polyethylene, solvent and nonsolvent are selected to give a flowable dispersion of the desired viscosity.

In general, a flowable stable dispersion of desirable viscosity contains from 10 to about 35%, preferably in the range of 10 to 20%, by weight of finely divided polyethylene particles. A 15% dispersion of polyethylene of 12,000 M. W. in a 1:1 petroleum naphtha-xylene mixture has a Brookfield viscosity (spindle 4 at 20 R. P. M.) of about 24 at 25° C. Dispersions of higher solids content within this range of polyethylene concentration have too high a viscosity to be measured accurately, but such dispersions are also flowable. The larger the percentage of polyethylene and the higher its molecular weight, the higher the viscosity of the dispersion.

For preferred results, the organic liquid medium should contain from about 60 to about 80% solvent by weight of the polyethylene, and 40 to 20% nonsolvent. Other proportions are operative, e. g., from about 30 to 90% of the solvent and 70 to 10% of the nonsolvent. At least 30% solvent must be present in order to obtain proper fusion of the polyethylene film to the base.

In one procedure, the dispersion is prepared by heating the desired amount of polyethylene with agitation in proper proportions of solvent and nonsolvent at an elevated temperature until a clear solution is formed. Usually, a temperature of at least 80° C., and not over 120° C., is adequate. However, much higher temperatures may be employed and the upper limit is controlled by the boiling point of the solvent and the pressure equipment available.

Depending on the degree of subdivision of the dry polyethylene raw material, the temperature and the amount of solvent present, the time required for complete solution will vary from several minutes to several hours. The time may be shortened by heating the mixture above the melting point of the polyethylene.

After solution is complete the rate of agitation desirably is increased and the resulting solution is then cooled slowly to room temperature at a rate not exceeding about 3° C. per minute and preferably in the range of about 0.1 to about 2° C. per minute. The slower the cooling rate, the smaller the particle size in the dispersion obtained. The cooling rate is critical, for if the solution is cooled too quickly, the particle size is too large, or large aggregates of particles form, and a good uniform film coating or design is not obtainable therewith.

Dispersions in accordance with the invention can also be prepared by mixing polyethylene with the above-described solvent-nonsolvent medium and subjecting it to attrition at elevated or ordinary temperatures, in usual mechanical means, such as a ball mill, or a colloid mill, but without use of excessive heat, preferably at or below 80° F., i. e., under conditions under which the resin would not dissolve in the liquid medium.

In a preferred embodiment, the average mean diameter of the polyethylene particles in the dispersion is in the range of 0.5 to 5 microns, many being about 1 to 2 microns. The mean average diameter may be up to 15 microns, or more, but should be below a mean average diameter of 40 microns.

The dispersion of the invention is applied to the polyethylene, polyvinyl resin, cellulose acetate or like base or substrate at room temperature by conventional means. Thereafter, the coated base is heated at an elevated temperature usually in excess of about 80° C. up to about 200° C. above the softening or fusing temperature of the dispersed solids, but below the softening point of the base, and for sufficient time to evaporate the solvents.

Ordinarily, from a few seconds to a few minutes is all that should be required to effect film formation. Under these conditions, in the presence of the solvent, the coating or design film is bonded firmly to the base. The presence of polyethylene in the composition is responsible for formation of a bond between the base and the design or coating composition which resists the adhesive stripping test described heretofore.

To prepare an ink, dry pigment or a suitable pigment dispersion may be incorporated in this dispersion in ordinary mixing equipment; or the pigment or pigment dispersion may be dispersed in the initial solution before cooling to room temperature. A suitable pigment dispersion to be added to the above product, for producing a blue ink, comprises phthalocyanine blue dispersed in a solvent compatible with the polyethylene dispersion, such as xylene. In addition, dispersions of resins, extenders, and other modifying agents and colorants may be added in a similar manner. An example of a suitable resin which may be incorporated to give the ink the desired "tack" is a fatty acid- or resin acid-modified phenolformaldehyde type resin, butyl rubber, nitrile rubber, polyisobutylene, neoprene, or any other suitable resin or mixture of resins which is compatible with the polyethylene composition. Coloring matter or pigment may be added to the resin dry, or as a dispersion in the resin or resin mixture. For instance, dry blue phthalocyanine pigment may be ground, as by ball milling, with an equal weight of the phenolformaldehyde resin dispersed in xylene and then added to the vehicle. Alternatively, the resinous tackifier may be added to the vehicle if desired, and then the pigment component may be flushed into the ink vehicle from a 30% phthalocyanine blue aqueous pulp.

This ink may be printed at room temperature upon a polyethylene, cellulose acetate or polyvinyl resin film having a higher softening temperature than the polyethylene in the ink with usual gravure printing apparatus. The printed film is then quickly heated for a short period in the range of a few seconds to several minutes, depending upon the temperature, which should be in the range of 80° C. (i. e., above the fusing temperature of the polyethylene in the print) up to just below the melting point of the base, e. g., about 5° C. below if the base is a polyethylene film. Heat may be applied by conventional means, such as infra red lamps or an oven, preferably with the aid of blowers. If heated moving air is used as the means, it may be at a temperature above the melting point of the base. The temperature and time are selected so that the liquid organic medium is substantially evaporated and the deposited polyethylene is fused without harming the base.

In this heat treatment, the solvents are evaporated, the deposited polyethylene material is fused to give a continuous film in the printed area, and also is bonded permanently and inseparably to the film base or substrate.

The resulting printed design is produced in one printing step and is entirely resistant to the adhesive tape test, e. g., using a transparent regenerated cellulose tape such as that sold as "Scotch cellulose tape."

The same procedure may be used for printing or coating with dispersions of the invention paper or other solid surfaces.

In order to facilitate a clear understanding of the invention, the following preferred illustrative embodiments are included.

*Example 1*

In a closed, jacketed vessel equipped with heating means, cooling means, and an efficient agitator, e. g., with a turbo-homogenizer, 15 pounds of polyethylene of a molecular weight of about 19,000 (fuses above about 80° C.) is added to a mixture of 59.5 pounds of xylene and 25.5 pounds of petroleum naphtha (boiling range of 320° to 390° F.) and the mixture stirred at a moderate rate at a temperature of 90 to 100° C. for one-half hour until a clear solution is obtained. The solution is then cooled slowly at a rate of 0.1° C. per minute while being agitated more rapidly than before. The resulting product is a stable 15% dispersion of finely divided polyethylene in the organic liquid medium, flowable at room temperature.

This product is suitable for use in coating or as an ink vehicle, and may be applied at room temperature or a higher temperature below the solution temperature on conventional coating equipment and then heat treated in conventional coating equipment to yield a clear, adherent, homogeneous film of any desired design and of any desired thickness, e. g., from 0.00025" to 0.005" or more.

For example an ink suitable for design printing is prepared by ball milling phthalocyanine blue pigment, with a small amount of white pigment (titanium dioxide), with an equal weight of phenol-formaldehyde resin dispersed in xylene, and this is added to the dispersion. This ink is printed in design form on a polyethylene resin film having a higher softening temperature than the polyethylene resin in the dispersion, and the printed film heated in an oven at an air temperature of 250° F. for a few minutes to remove the solvents and bond the polyethylene design to the film. The printed polyethylene design is entirely resistant to stripping from the polyethylene film by the adhesive tape test.

*Example 2*

Following the procedure of Example 1, 15 pounds of polyethylene of average molecular weight of about 12,000 is mixed with 50 to 60 pounds of toluene and 30 to 20 pounds of methyl isobutyl ketone, heated to the "clear point" and cooled slowly. The resulting product is a stable paste which is more flowable or less viscous than that of Example 1.

This product may be printed or coated like that of Example 1, or made into an ink, e. g., by simply stirring in a blue or other pigment dispersion, and this ink printed upon polyethylene film or other surfaces as described in Example 1. The printed polyethylene film is then heat treated as described in Example 1.

The resulting printed design on the polyethylene film is entirely resistant to stripping by the adhesive tape test.

This particular vehicle and inks made therefrom are especially suitable for printing on vinyl polymer type films or surfaces, and produce a bond between the printed design and the vinyl polymer surface which is entirely resistant to the adhesive tape test.

*Example 3*

Following the procedure of Example 1, 9 pounds of polyethylene of an average molecular weight of about 19,000 is dissolved in 65 pounds of a solvent mixture similar to that described in Example 1 and cooled slowly at a rate of 0.1° C. per minute. The resulting product is a stable readily flowable paste containing about 12% of finely dispersed polyethylene. It is suitable for direct use or for preparing inks, as described in the above examples.

To this paste there is added at room temperature with stirring, 12 pounds of a color paste consisting of 6 pounds of chrome yellow dispersed in 6 pounds of a solution of a heat-hardenable urea-formaldehyde reaction product consisting of 50% by weight of the urea-formaldehyde reaction product, 25% xylene and 25% butanol. Then 13 pounds of water is added thereto and the resulting mixture homogenized or emulsified in a colloid mill. If desired, there may be incorporated therein a small percentage, e. g., ½ ounce, of a known emulsifying agent, e. g., triethanolamine stearate.

The resulting product is a water-in-oil type emulsion, and is eminently suitable for textile printing by usual methods. It contains 3 pounds of the urea-formaldehyde condensate per 9 pounds of polyethylene; if desired, other proportions of the urea-formaldehyde in the range of 1 to 6 pounds may be used, for obtaining comparable results. The printed textile web produced therefrom may be submitted to a temperature which is sufficiently high to heat-harden the urea-formaldehyde reaction product, and give an adherent printed design. Alternatively, a latent catalyst such as di-ammonium phosphate, or ammonium lactate, or ammonium chloride may be added to the ink just before printing, in a small amount, e. g., 1.5% based on the weight of the urea-formaldehyde reaction product, to facilitate heat-hardening of the resin at lower temperatures.

*Example 4*

Following the procedure of Example 1, 20 pounds of polyethylene of a molecular weight of about 19,000 is mixed with 45 pounds of xylene and 35 pounds of butyl alcohol, and heated to the "clear point." The hot mixture is diluted with sufficient xylene so that the organic medium contains at least 70% xylene, and then cooled slowly, at a rate of 2° C. per minute, to yield a paste, as in Example 1. The resulting product is suitable for coating, or for preparing inks, as described in the preceding examples.

This mixture may be diluted with the same solvent mixture to make it suitable for coating cold or prewarmed metal objects, such as a tool or a gauge, by a dip technique. The object is dipped into the composition and instantly withdrawn. A thin coating of the mixture forms upon the object, and there is no tear-drop or gob formed such as is usual with other protective dipping compositions. The coated object is heat-treated in a drying oven to remove the organic liquid medium and fuse the crystalline polyethylene deposit into a continuous film which is admirably suited for protecting the surface of the object, especially against corrosion. This procedure is more desirable than a heretofore suggested flame-spraying method of coating with polyethylene.

*Example 5*

In a heated mixer, 35 pounds of polyethylene of an average molecular weight of about 7,000 is mixed with 15 pounds of acetylene black and 50 pounds of a liquid mixture as described in Example 1 and containing 80% by weight of the xylene and 20% of the naphtha, and kneaded at 70° C. until a homogeneous dough-like product results.

This composition is suitable for application to metal conductors before they are covered with an insulating jacket; or it may be applied over the insulating jacket. It may be applied at an elevated temperature below the solution temperature of the polymer. There is thus provided a semi-conductor which may be grounded to collect stray currents and lead them to the ground, thus prolonging the life of the insulation.

This composition may be diluted by adding more of the same organic liquid mixture, and processed as in Example 1 to give a paste or composition which is suitable for coating, printing, or spraying at room temperature. The thereby coated article is heat-treated as described above, to provide a continuous coating or printing design.

Polyethylene tape may be coated with this material on either one or both sides to give a tape which may be used as a semi-conducting tape for eliminating stray electrical currents. The tape may be fused by heating the overlapping areas to give a continuous film on the article which is covered with the tape.

*Example 6*

The procedure of Example 1 is followed in this example, except that the polyethylene is first dissolved in the xylene solvent, i. e., brought to the "clear point," then the petroleum naphtha nonsolvent is added, and the mixture cooled slowly at a rate of 3° C. per minute. The petroleum naphtha may be added while relatively hot, or alternatively it may be cold and added with rapid agitation to assist in cooling the mixture.

*Example 7*

The procedure of Example 2 is followed in this example, except that the polyethylene is first dissolved in the toluene solvent, i. e., brought to the "clear point," then the methyl ethyl ketone nonsolvent is added, and the mixture cooled slowly at a rate of 2° C. per minute. The nonsolvent may be added while relatively hot, or alternatively it may be cold and added with rapid agitation to assist in cooling the mixture.

*Example 8*

The procedure of Example 3 is followed in this example, except that the polyethylene is first dissolved in the xylene solvent, i. e., brought to the "clear point," then the petroleum naphtha nonsolvent is added, and the mixture cooled slowly at a rate of 3° C. per minute. The petroleum naphtha may be added while relatively hot, or alternatively it may be cold and added with rapid agitation to assist in cooling the mixture.

*Example 9*

Following the procedure of Example 1, 16.15 pounds of polyethylene of a molecular weight of about 19,000 is mixed with 26.4 pounds of Shell E407 solvent (a solvent mixture derived from petroleum, boiling range 386–495° F., approximately 80% aromatics, the remainder paraffins) and 335 pounds of Shell TS–28R solvent (a solvent mixture derived from petroleum, boiling range 316–392° F., approximately 73% aromatics, the remainder paraffins) and heated at 90–100° C. with stirring until a clear solution is obtained. The stirring rate is increased, and the solution is then cooled slowly at a rate of 0.1° C. per minute. A stable flowable polyethylene dispersion is obtained.

To this dispersion there is added at room temperature, with stirring, 12.1 pounds of a 1:1 mixture of Durez (phenol-formaldehyde) resin and Vistanex (polyisobutylene) resin and 11.85 pounds of a blue pigment composed of a mixture of phthalocyanine blue and titanium dioxide. The resulting blue ink is then printed in design form on a polyvinyl resin film, and heated in an oven at 250° F. for a few minutes to volatilize the solvent and bond the polyethylene to the film. The printed polyethylene design is firmly bonded, and is resistant to stripping by the adhesive tape test.

The printed or coated products prepared in accordance with the invention are eminently suited for packaging. These films inherently are resistant to acids and alkalies, impervious to water, insoluble in many organic solvents at normal temperature, and have extremely low moisture vapor transmission, relatively high, excellent heat and light stability, good flexibility at sub-zero temperatures, absence of taste or odor and excellent insulation properties.

One desirable feature of the method of printing provided by this invention is the elimination of the health and fire hazards associated with previously proposed hot solution methods of applying polyethylene coatings. The final heat treatment of the printed or coated material may be conducted in usual, suitably designed, non-hazardous apparatus.

Although it is not desired to limit the invention by any theory, it is believed that the above-described preferred unique results are associated with the method of obtention of the dispersion of the polyethylene in the organic liquid medium, by simultaneous agitation and slow cooling of the clear liquid solution.

So far as is known, all prior methods for coating with the polyethylene require that the hot coatings be heated immediately or instantly, to avoid formation of crystals and commercially valueless, discontinuous coatings. Crystalline aggregates of polyethylene as would be formed by cooling such hot coatings are of excessively large particle size and undergo tremendous dimensional contraction even with small drops in temperature and shrink away from each other so as to form cracks and aisles in the surface, and give an undesirable "island" pattern.

It is believed that the combination of the fine particle size together with the particular liquid medium, facilitates giving a coated or printed deposit thereof in accordance with the invention, which, when heated to a temperature above the fusion temperature of the polyethylene deposit and below the softening temperature of the base film, rapidly releases the organic liquid carrier medium, suitably bonds to the base film to provide a very adherent coating or print, and gives sufficient fusion, solvation, or cementing action at the contact points of the polyethylene particles to give a smooth printed design or coating which is entirely free of undesirable "aisle" or "island" effects.

The invention as described herein is subject to variation and modification within the scope of the appended claims.

This application is a continuation-in-part of Serial No. 106,492, filed July 23, 1949, to Henry Jenett.

The following is claimed:

1. The process of preparing a polyethylene dispersion which comprises forming, at an elevated temperature, a clear solution from about 10% to 35% by weight of initially solid polyethylene in an organic liquid medium consisting essentially of 30% to 90% by weight of an organic solvent for polyethylene having a boiling point in the range of 80° C. to 300° C., and 70% to 10% by weight of an organic nonsolvent for polyethylene having a boiling point in the range of 25° C. to 300° C.; and simultaneously agitating and cooling said solution, said cooling being effected at a rate not greater than about 3° per minute, to form a stable, finely-divided dispersion, flowable at room temperature, of polyethylene in said organic liquid medium, said organic nonsolvent being an organic liquid which will not dissolve solid polyethylene at elevated temperatures below the melting point of polyethylene to form a clear solution.

2. The process of claim 1 wherein the solvent is xylene and the nonsolvent is petroleum naphtha.

3. A method of coating a solid polyethylene surface which comprises applying to said polyethylene surface a stable, flowable dispersion of 10% to 35% by weight of finely-divided polyethylene having a mean average particle size of 0.5 to 40 microns and a lower molecular weight than the polyethylene of said surface; said finely-divided polyethylene being dispersed in an organic liquid medium consisting essentially of 30% to 90% by weight of an organic polyethylene solvent having a boiling point in the range of 80° C. to 300° C., and 70% to 10% by weight of an organic polyethylene nonsolvent having a boiling point in the range of 25° C. to 300° C.; and thereafter heating said polyethylene surface to which said dispersion has been applied to an elevated temperature of about 80° C. to about 5° C. below the melting point of said surface to volatilize said medium and convert the finely-divided polyethylene of the dispersion into a homogeneous film firmly bonded to said surface; said organic nonsolvent being an organic liquid which will not dissolve solid polyethylene at elevated temperatures below the melting point of polyethylene to form a clear solution.

4. The method of claim 3 wherein the solvent is xylene and the nonsolvent is petroleum naphtha.

5. The process of claim 3 wherein the polyethylene dispersion contains a pigment.

6. The process of claim 5 wherein the polyethylene dispersion contains a resin compatible with polyethylene.

CAROLINE LOUISE MARIA JENETT,
*Executrix of the Estate of Henry Jenett, Deceased.*

REFERENCES CITED

The following references are of record in the file of this patent:

UNITED STATES PATENTS

| Number | Name | Date |
|---|---|---|
| 1,960,220 | Hopkins | May 22, 1934 |
| 2,023,175 | Kneip | Dec. 3, 1935 |
| 2,302,332 | Leekley | Nov. 17, 1942 |
| 2,375,396 | Watkins | May 8, 1945 |
| 2,384,848 | Peters | Sept. 18, 1945 |
| 2,429,861 | Woodbridge | Oct. 28, 1947 |
| 2,431,873 | Kennelly | Dec. 2, 1947 |
| 2,490,536 | Murphy et al. | Dec. 6, 1949 |
| 2,561,951 | Roberts | July 24, 1951 |